(12) United States Patent
Watanabe et al.

(10) Patent No.: US 7,244,093 B2
(45) Date of Patent: Jul. 17, 2007

(54) OBJECT HANDLING APPARATUS

(75) Inventors: Atsushi Watanabe, Tokyo (JP); Kazuhisa Otsuka, Yamanashi (JP); Masaru Oda, Yamanashi (JP); Tadanori Suzuki, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 10/627,722

(22) Filed: Jul. 28, 2003

(65) Prior Publication Data

US 2004/0037689 A1    Feb. 26, 2004

(30) Foreign Application Priority Data

Aug. 23, 2002   (JP)   ............................. 2002-243498

(51) Int. Cl.
*B25J 9/16* (2006.01)
(52) U.S. Cl. ................. 414/806; 198/395; 414/222.01; 414/226.02; 414/729; 700/245; 901/8; 901/47
(58) Field of Classification Search ................ 414/729, 414/5; 198/395; 901/2, 8, 46, 47, 31; 700/245; 294/64.1
See application file for complete search history.

(56) References Cited

U.S. PATENT DOCUMENTS 3,227,290 A * 1/1966 Lemelson ................ 414/729 X (Continued)

FOREIGN PATENT DOCUMENTS

EP    0 951 968 A2   10/1999

EP    1 043 642 A2   10/2000

(Continued)

OTHER PUBLICATIONS

Nakazawa, Kazuo, "Compensation of Robot Hand Position Using Vision Sensor", Industrial Electronics, Control and Instrumentation, 1994. IECON '94., 20th International Conference on Bologna, Italy Sep. 5-9, 1994, IEEE, Sep. 5, 1994.
European Search Report dated Apr. 20, 2005 for corresponding application no. 03 254 997.4 d.

*Primary Examiner*—Donald Underwood
(74) *Attorney, Agent, or Firm*—Staas & Halsey LLP (57) ABSTRACT

An object handling apparatus capable of securely holding an object and precisely transferring the held object from a first place to a second place without need of a specific jig for positioning the object on a pallet. A position of an object supplied to the first place is detected by a first visual sensor to obtain a compensation amount for compensating a position displacement of the supplied object. The object is held by a robot hand having position/orientation compensated using the compensation amount and position/orientation of the object held by the robot hand relative to the robot hand is detected by a second visual sensor. A displacement of the position/orientation of the object held by the robot hand from a reference position/orientation is compensated based on the detected position/orientation of the object on the robot hand, so that the object held by the robot hand is precisely moved to have a predetermined position/orientation to be transferred to the second place. The robot hand may be a servo hand having fingers driven by one or more servomotors so that position and force of the fingers in holding the object is controlled.

13 Claims, 4 Drawing Sheets

U.S. PATENT DOCUMENTS

| | | | |
|---|---|---|---|
| 3,904,042 A * | 9/1975 | Colston ................ 901/31 X |
| 4,402,053 A | 8/1983 | Kelley et al. |
| 4,604,016 A * | 8/1986 | Joyce ........................ 414/5 |
| 4,636,137 A | 1/1987 | Lemelson |
| 5,671,962 A | 9/1997 | Otsuka et al. |
| 6,244,644 B1 * | 6/2001 | Lovchik et al. .......... 294/111 |
| 6,405,101 B1 * | 6/2002 | Johanson et al. ........ 700/218 |
| 6,430,474 B1 * | 8/2002 | DiStasio et al. ......... 700/245 |

FOREIGN PATENT DOCUMENTS

| | | |
|---|---|---|
| JP | 64-027885 | 1/1989 |
| JP | 03-287394 | 12/1991 |
| JP | 06-099382 | 4/1994 |
| JP | 08-090467 | 4/1996 |

\* cited by examiner

OBJECT HANDLING APPARATUS

BACKGROUND OF THE INVENTION

1. Field of the Invention

The present invention relates to an object handling apparatus for handling an object such as a workpiece using a robot to transfer the object from one place to another place.

2. Description of Related Art

For automatically performing machining of workpieces, assembling of parts, etc., robots are used as means for transferring objects such as workpieces and parts from one process to the next process. In the case where the next process is machining of an object by a machine such as a machine tool, it is required that the object is precisely positioned to have a predetermined position/orientation so as to be mounted by an object mounting jig of the machine tool. Similarly, in the case of assembling of parts, it is required that the objects held by the robot is precisely positioned to have a predetermined position/orientation in transferring the object to the next process.

To meet the above requirements, conventionally, the objects are supplied by pallets having positioning devices such as positioning jigs for positioning the objects on the pallets so that the robot holds the objects having predetermined position/orientation. By supplying the objects positioned on the pallets by the positioning devices, the robot securely holds the object at a predetermined holding position/orientation taught in advance. However, there are problems that the pallets equipped with the positioning devices are of high price and a great number of pallets with different kinds of positioning devices have to be prepared for different kinds of objects.

Further, if the object is greatly displaced from the predetermined position/orientation on the pallet by an unexpected cause, the robot fails in holding the object by a robot hand to cause a stoppage of the automatic operation.

Even if the object is held by the robot hand, if position/orientation of the object held by robot hand relative to the robot hand is displaced from the predetermined position/orientation, there arise a problem in transferring the object to the next process. For example, in the case where the next process is machining of the object by the machine such as a machine tool, if there is a displacement of the position/orientation of the object relative to the robot hand, the object can not be mounted on the machine by the object mounting jig.

To cope with the above problem, various kinds of robot hands designed for various shapes and materials of the objects have been prepared so that the position/orientation of the object held by the robot hand relative to the robot hand is not displaced from the predetermined position/orientation. However, it is necessary to prepare a large number of robot hands designed for holding the various kinds of objects, and also rests for placing the large number of robot hands are necessary so that an installing area of the apparatus increases, to rise manufacturing cost of the apparatus and products.

SUMMARY OF THE INVENTION

The present invention provides an object handling apparatus capable of securely holding an object and precisely transferring the held object from a first place to a second place without need of a specific jig for positioning the object on a pallet.

According to one aspect of the present invention, an object handling apparatus comprises: a robot having a robot hand for holding the object; detecting means for detecting position/orientation of the object held by the robot hand relative to the robot hand; and compensating means for compensating position/orientation of the robot hand for transferring the object to the second place based on the position/orientation of the object relative to the robot hand detected by the detecting means.

According to another aspect of the present invention, an object handling apparatus comprises: a robot having a robot hand for holding the object; first detecting means for detecting a position of the object supplied to the first place; control means for moving the robot hand to a holding position for holding the object using the detected position of the object detected by the first detecting means and for controlling the robot hand to hold the object at the holding position; second detecting means for detecting position/orientation of the object held by the robot hand relative to the robot hand; moving means for moving the robot hand or the second detecting means such that the robot hand holding the object has a predetermined detecting position/orientation relative to the second detecting means; and compensating means for compensating position/orientation of the robot hand predetermined for transferring the object to the second place based on the position/orientation of the object held by the robot hand relative to the robot hand detected by the second detecting means.

The object may be transferred by the object handling apparatus to a jig of a machine tool at the second place. The robot hand may have fingers driven by one or more servomotors. In this case, the robot hand may hold the object by positioning of the fingers by the one or more servomotors in accordance with a shape of the object. The command torques to the one or more servomotors for driving the fingers of the robot hand may be altered in accordance with characteristics such as material and shape of the object, and the one or more servomotors may be controlled by a controller of the robot.

The first detecting means may comprise a two-dimensional visual sensor or a three-dimensional visual sensor. Also, the second detecting means may comprise a two-dimensional visual sensor or a three-dimensional visual sensor. The first detecting means may function as the second detecting means. The moving means may comprise an additional robot to which the second detecting means is attached.

DETAILED DESCRIPTION OF PREFERRED EMBODIMENTS

First, a general arrangement of an object handling apparatus according to an embodiment of the present invention will be described referring to FIGS. 1 and 2.

Figure 1:
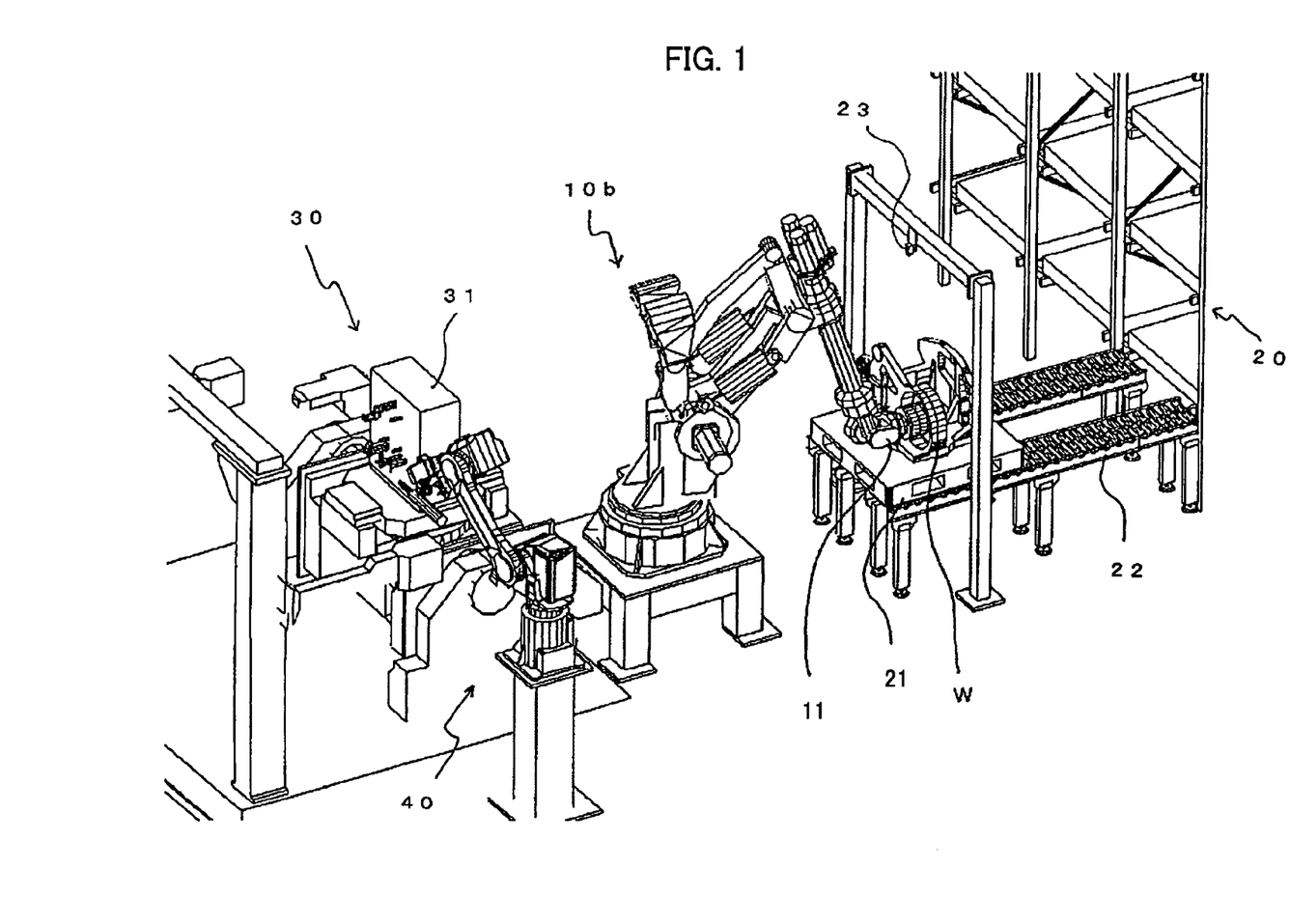
FIG. 1 is a perspective view of an object handling apparatus in a state of taking out an object from a pallet by a robot according to an embodiment of the present invention.
Figure 2:
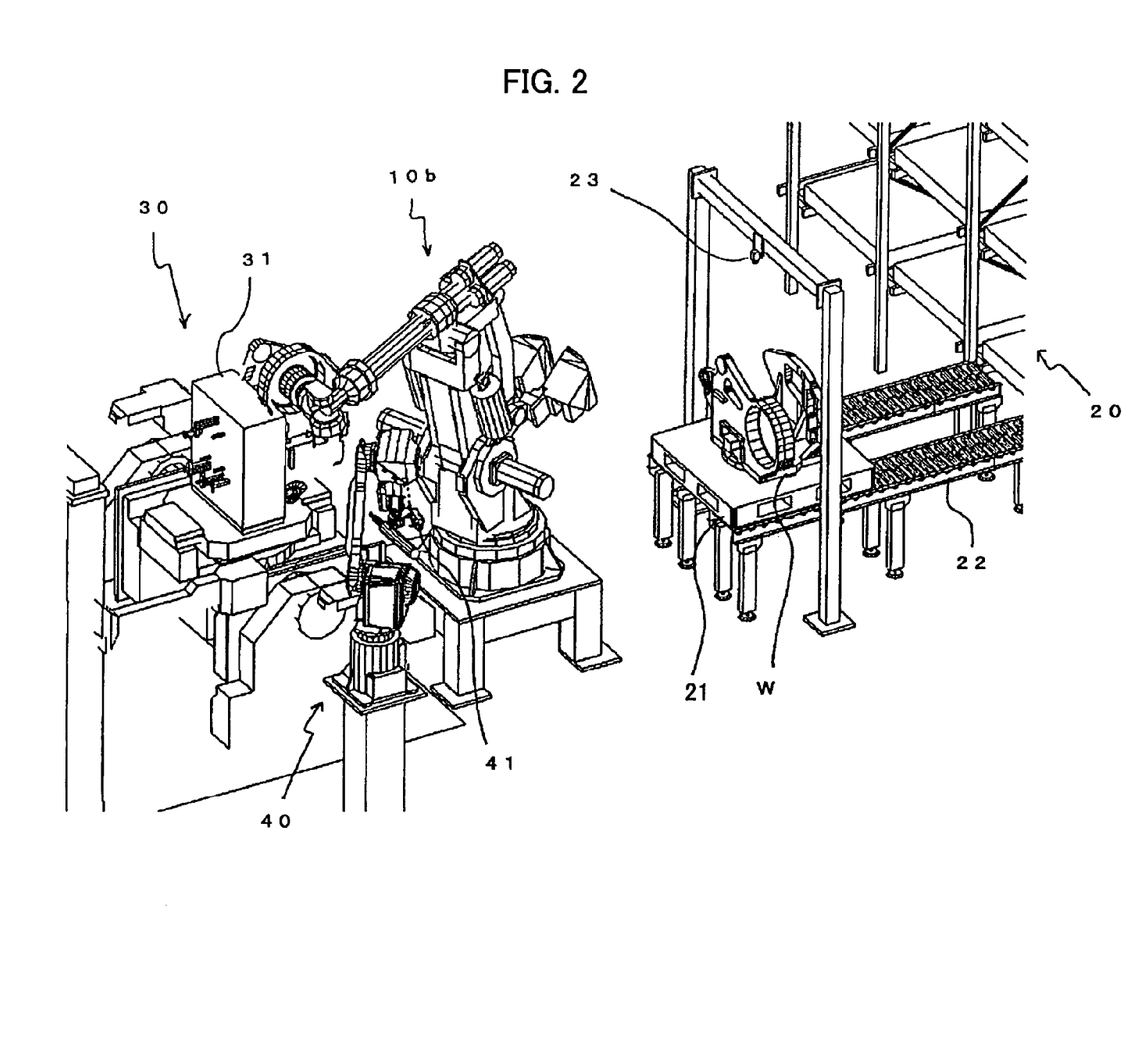
FIG. 2 is a perspective view of the handling apparatus in a state of mounting the object on an object mounting jig of a machine.

As shown in FIG. 1, an object W placed on a pallet 21 and stored in an automatic storehouse 20 is supplied to an object supply place with the pallet 21 by a conveying device 22. A first robot 10b is arranged such that an operational range thereof covers the workpiece supply place and also an install place of a machine 30 such as a machine tool. The first robot 10b takes out an object W from the pallet 21 by holding the object W by a hand 11 attached to a wrist thereof and transferring the held workpiece W to an object mounting jig 31 of the machine 30.

A fist-first visual sensor 23 as first detecting means for detecting position/orientation of the supplied workpiece W is arranged in the vicinity of the object supply place. The first visual sensor 23 may be a two-dimensional sensor for detecting the position/orientation of the supplied workpiece more precisely.

In this embodiment, a second robot 40 is arranged such that an operation range thereof overlaps the operation range of the first robot 10b and a second visual sensor 41 as second detecting means is attached to a wrist of the second robot 40. The second visual sensor 41 is provided for detecting position/orientation of the workpiece W held by the hand 11 of the first robot 11b relative to the hand 11. The second robot 40 is provided for placing the second visual sensor 41 to have position/orientation where a displacement of the position/orientation of the workpiece W held by the hand 11 of the first robot 10b relative to the hand 11 from a reference position/orientation.

A servo hand having fingers driven by one or more servomotors is adopted as the hand 11 of the first robot 10b and a position and a force of gripping by the fingers are controllable. The one or more servomotors for driving the fingers are controlled by a servo control section of the robot controller of the first robot 10b.

Figure 3:
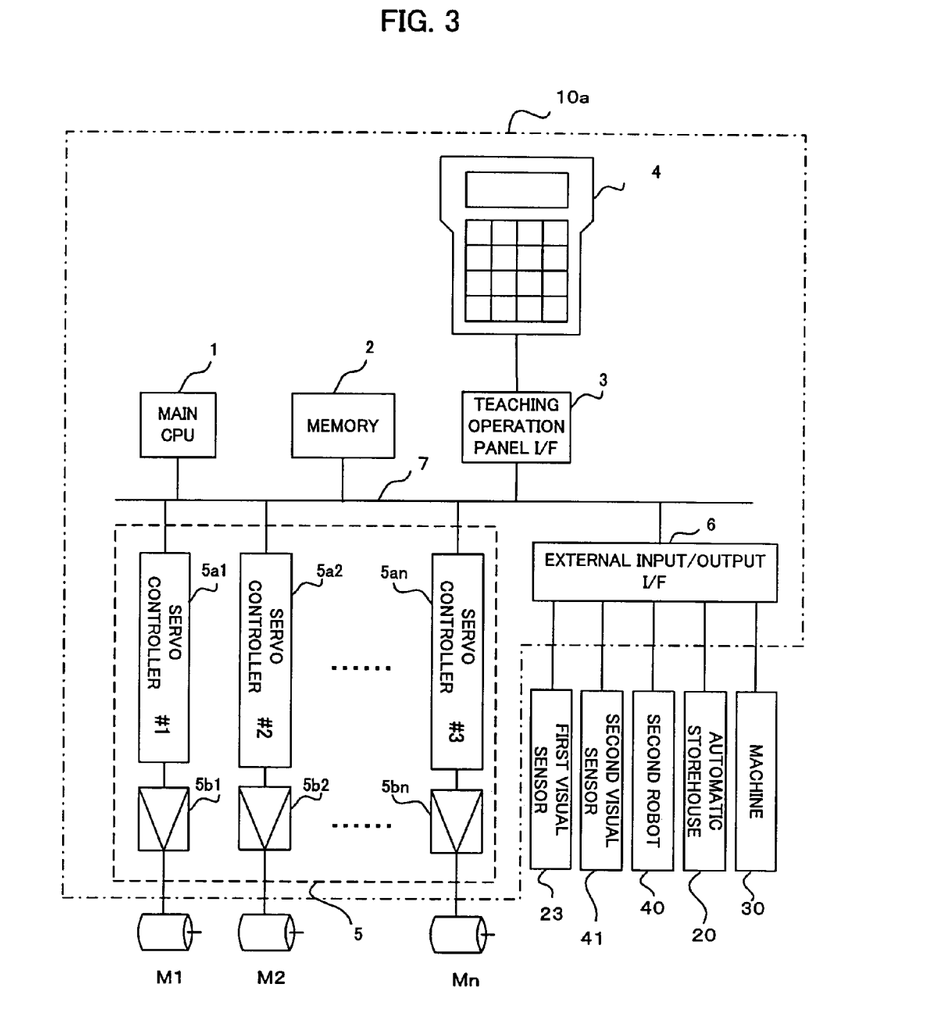
FIG. 3 is a block diagram of a control section of the object handling apparatus.

FIG. 3 shows a robot controller 10a of the first robot 10b which functions as a control section of the object handling apparatus.

A main processor (CPU) 1, a memory including a RAM, a ROM and a nonvolatile memory (EEPROM, etc.), an interface 3 for a teaching operation panel 4, an interface 6 for external devices and a servo control section 5 are connected to a bus 7.

A system program for supporting a basic function of the robot controller 10a is stored in the ROM of the memory 2. Operation programs and associated data therewith prepared by teaching operations to the robot for respective applications are stored in the nonvolatile memory of the memory 2. The RAM of the memory 2 is used for temporary storage of data in arithmetic operations by the processor 1.

The servo control section 5 comprises servo controllers 5a1-5an (n: the sum of the number of axes of the robot and the number of axes of the servo hand), each of which including a processor, a ROM and a RAM to perform a position and velocity loop control and a current loop control of an associated one of the servomotors M1-Mn. Each of the servo controllers 5a1-5an is constructed as a digital servo controller which performs the position, velocity and current loop controls by software means. The servomotors M1-Mn are respectively driven by the servo amplifiers 5b1-5bn in accordance with the outputs of the servo controllers 5a1-5an. Although not shown in FIG. 3, position/velocity detectors are respectively provided at the servomotors M1-Mn, and position/velocity of the respective servomotors detected by the position/velocity detectors are respectively fed back to the servo controllers 5a1-5an. The first visual sensor 23, the second visual sensor 41, a robot controller of the second robot 40, a controller of the automatic storehouse 20, a controller of the machine 30 and further the peripheral devices of the first robot are connected to the input/output interface 6.

The robot controller having substantially the same hardware configuration as a conventional robot controller is adoptable as the robot controller 10a of the first robot 10b. The above-described robot controller 10a constitutes the control section of the object handling apparatus of the present invention.

Figure 4:
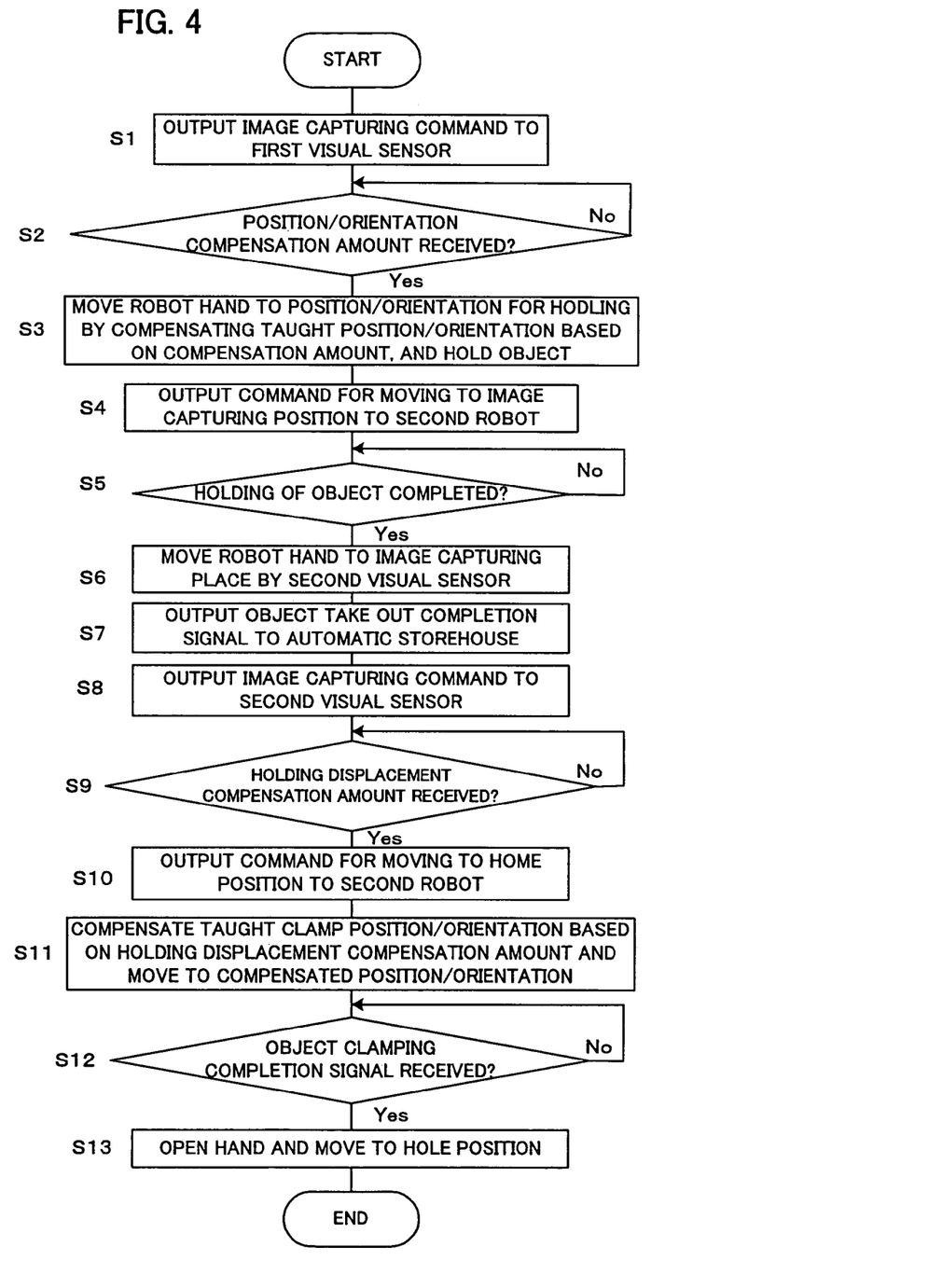
FIG. 4 is a flowchart of processing to be performed by a processor of the object the handling apparatus.

An operation of the object handling apparatus according to the embodiment will be described referring to a flowchart of FIG. 4. FIG. 4 shows processing to be performed by the processor 1 of the robot controller 10a of the first robot 10b which functions as the control section of the object handling apparatus.

When a command for transferring an object from the object supply place to the machine is inputted to the robot controller 10a of the first robot 10a (the control section of the handling apparatus) from the controller of the machine 30 through the interface 6, the main processor 1 of the robot controller 10a starts the processing shown in FIG. 4.

A command for capturing an image of an object is outputted to the first visual sensor 23 through the interface 6 (Step S1), and the processor 1 waits an arrival of a position/orientation compensation amount from the fist visual sensor 23 (Step S2). The first visual sensor 23 captures an image of the object W supplied at the object supply place upon receipt of the image capturing command from the processor 1 of the robot controller 10a. The first visual sensor 23 calculates a displacement of the position/orientation of the supplied object W from a predetermined reference position/orientation and sends the displacement as position/orientation compensation amount to the controller 10a.

The processor 1 decides position/orientation for the robot hand 11 for taking out an object by compensating the position/orientation taught in advance based on the compensation amount received from the first visual sensor 23, and moves the robot hand 11 to have the decided position/orientation for taking out the supplied object and operates the robot hand 11 to hold the object W with the fingers (Step S3). Then, the processor 1 issues a command to move the second visual sensor 41 to an object image capturing position to the controller of the second robot 40 (Step S4).

It is determined whether or not the holding operation of the object W by the robot hand 11 is completed based on determination whether or not an output torque (driving current) of the servomotors for driving the fingers of the robot hand 11 reaches set values (Step S5). Alternatively, the completion of the holding operation may be determined based on an output of a force sensor for sensing griping force of the fingers. When it is determined that the holding operation is completed, a command to move the held object W to the place of image capturing by the second visual sensor 41 is issued (Step S6), and a signal indicating completion of taking out the object is issued to the automatic storehouse 20 (Step S7). The controller of the automatic storehouse 20 returns the empty pallet 21 into the storehouse and supplies a new pallet 21 on which another object is placed to the object supply place.

The processor 1 outputs an image capturing command to the second visual sensor 41 (Step S8). The second visual sensor 41 captures an image of the object W held by the robot hand 11 upon receipt of the image capturing command. The controller of the second visual sensor 41 calculates a displacement of the position/orientation of the object W relative to the robot hand 11 from a predetermined reference position/orientation and sends the displacement as a held position/orientation compensation amount to the controller 10a of the first robot 10b. The processor 1 issues a command to the second robot 40 to return to a home position (Step S10) upon receipt of the held position/orientation compensation amount (Step S9). The processor 1 compensates the position/orientation taught in advance for clamping of the object by the object mounting jig of the machine 30 based on the held position/orientation compensation amount received from the second visual sensor 41, and moves the robot hand 11 to have the compensated position/orientation at which the workpiece W is clamped by the object mounting jig (Step S11).

Upon receipt of a clamping completion signal from the controller of the machine 30 (Step S12), the robot hand 11 is opened and moved to the home position (Step S13), to terminate the processing of transferring the object W to the machine 30.

Since the servo hand having fingers driven by one or more servomotors is adopted as the robot hand 11 for holding an object W, an object W is securely and precisely held by the fingers of the robot hand 11 by controlling gripping positions of the fingers by the servomotors even if the object to be handled has a different shape. Further, a desired holding force suitable for shape, material, hardness and weight of the object is obtained by setting command torques for obtaining the desired holding force to the controllers of the servomotors for driving the fingers of the robot hand 11. Thus, it is not necessary to prepare a number of robot hands designed for different kinds of objects, so that the number of robot hands is reduced. Further, since the position of the fingers of the robot hand is controllable, objects densely placed on the pallet can be held by the fingers so that a large number of objects can be arranged on the pallet to improve an efficiency of arrangement of the objects on the pallet.

Since the servomotors of the servo hand are controlled by the servo controllers in the robot controller 10a of the first robot 10b to which the servo hand is attached, it is not necessary to provide controllers dedicated for the servo hand to reduce a manufacturing cost and the servo hand can cooperate in synchronism with the operation of the first robot to improve an operation efficiency.

In the foregoing embodiment, two visual sensors of the first visual sensor 23 and the second visual sensor 1 are provided. However, a single visual sensor may function as the two visual sensors. For instance, the second robot 40 may operate to move the visual sensor 41 attached to the second robot 40 to have the position/orientation for capturing an image of an object W supplied to the object supply place, and a displacement of the position/orientation of the supplied object W is obtained based on the captured image of the object W and sent to the robot controller 10a of the first robot 10b, so that the visual sensor 41 performs the function of the first visual sensor 23 in the foregoing embodiment, as well as performs the function of the second visual sensor for capturing an image of the object W held by the robot hand 11 to detect a displacement of position/orientation of the object relative to the robot hand 11.

Further, in the foregoing embodiment, the second visual sensor 41 is attached to the wrist of the second robot 40. The second visual sensor may be arranged at a fixed position instead of being attached to the wrist of the second robot 40. In this case, the second visual sensor captures an image of the object W held by the robot hand 11 with predetermined position/orientation. Further, in dependence of a shape of the object and the operation range of the first robot 10a for holding the object, the first visual sensor 23 may capture an image of the workpiece W hold by the robot hand 11 of the first robot 10b to detect the position/orientation of the held object W relative to the robot hand 11, as well as capture an image of the workpiece W supplied to the object supply place.

The foregoing embodiment is directed to an operation of transferring an object supplied from the automatic storehouse 20 to the machine 30. However, the present invention is applicable to various usages as follows;

a. In supplying an object such as a plate to a welding position, the object can be moved to the welding position/orientation by compensating a displacement of the position/orientation of the object held by the robot hand to precisely supply the object with the welding position/orientation. Further, in welding an object such as a plate as being held by the robot hand, the robot hand is moved so that a displacement of the position/orientation of the object on the robot hand is compensated to thus eliminate a displacement of welding position and realize precise welding.

b. In an assembling operation of parts of an automobile and an electric device, a displacement of position/orientation of the part held by a robot hand is compensated so that the part is precisely moved to have a predetermined assembling position/orientation, to improve efficiency of the assembling operation.

c. In an operation of automatically inspecting an object, a displacement of the position/orientation of the object held by the robot hand is compensated so that the object is always supplied to have a predetermined inspecting position/orientation, to improve an efficiency of the inspection operation.

d. In supplying an object to a deburring place by a robot hand or in performing a deburring operation on an object held by a robot hand, a displacement of the position/orientation of the object held by the robot hand is compensated so that the object is moved to have predetermined position/orientation, to perform a precise deburring operation.

e. In supplying an object to a sealing place for sealing operation or in perform a sealing operation on an object held by the robot hand while moving the object, a displacement of the position/orientation of the held object relative to the robot hand is compensated in the same manner as in the foregoing embodiment, to perform a precise sealing operation.

f. In an operation of supplying an object to a painting place for painting the object, and an operation of supplying an insert part to an insert place in a mold of an injection molding machine, a displacement of the position/orientation of the held object relative to the robot hand is compensated so that the object is supplied precisely to improve efficiency of the operation.

According to the present invention, an object is precisely positioned to have predetermined position/orientation by a robot even if position/orientation of the object held by a robot hand is displaced in gripping the object by the robot hand, to improve efficiency of the operation. Thus, the object is precisely transferred from an object supply place to a machine without using an object positioning jig on a pallet, to eliminate cost for providing the object positioning jig on the pallet. Further, since an object is securely held by the robot hand even if the objects are different in shape, hardness, material and weight, or the objects are densely arranged on the pallet, it is not necessary to prepare various kinds of robot hands for the different kinds of objects and efficiency of arranging the objects on the pallet is improved, to reduce the cost of manufacturing.

What is claimed is:

1. An object handling apparatus for handling an object to transfer the object from an object supply place to an install place of a machine with a predetermined position/orientation, the apparatus comprising:
 a movable device adjacent to the object supply place delivering the object;
 a first visual sensor provided at the object supply place detecting a position/orientation of the object on the movable device and calculating a displacement of the position/orientation of the object from a predetermined reference position/orientation and sending an object output;
 a first robot picking up the object from the movable device based on position/orientation of the object output from the first visual sensor to a first robot controller, the first robot including a first robot hand, the first robot hand including a plurality of fingers for holding the object, wherein the fingers are driven by one or more servomotors controlled by the first robot controller so that a position and a force of gripping by the fingers on the object is controlled;
 a second visual sensor detecting a position/orientation of the object in the first robot hand; and
 a second visual sensor controller receiving the position/orientation of the object in the first robot hand detected by the second visual sensor and calculating a displacement from a predetermined reference position/orientation of the object relative to the first robot hand and sending the displacement as a held position/orientation compensation amount to the first robot controller,
 wherein
  the first robot controller drives the plurality of fingers to compensate for the displacement of the position/orientation of the object, and
  when the position/orientation of the object has been compensated for, the first robot delivers the object to the install place of the machine.

2. The object handling apparatus according to claim 1, wherein the object is transferred to a jig of a machine tool at the install place of the machine.

3. The object handling apparatus according to claim 1, wherein the first visual sensor is a two dimensional sensor.

4. The object handling apparatus according to claim 1, wherein the first visual sensor is a three dimensional sensor.

5. An object handling apparatus according to claim 1, wherein the first robot controller controls the one or more servomotors to further control the torque placed on the object by the fingers.

6. A method of transferring an object from an object supply place to an install place, comprising:
 determining a position/orientation of the object at the object supply place with a first visual sensor, the first visual sensor being provided at the object supply place;
 picking up the object with a first robot hand having a plurality of fingers based on the position/orientation of the object as determined by the first visual sensor;
 moving the first robot hand to an image capturing position and determining a position/orientation of the object in the robot hand with a second visual sensor;
 adjusting the plurality fingers of the first robot hand to compensate for a difference between the position/orientation of the object in the robot hand from the second visual sensor and a predetermined position/orientation of the object in the robot hand;
 moving the first robot hand to the install place; and
 opening the first robot hand and delivering the object to the install place.

7. The method according to claim 6, wherein the first visual sensor comprises a two-dimensional visual sensor.

8. The method according to claim 6, wherein the first visual sensor comprises a three-dimensional visual sensor.

9. The method according to claim 6, wherein the second visual sensor comprises a two-dimensional visual sensor.

10. The method according to claim 6, wherein the second visual sensor comprises a three-dimensional visual sensor.

11. The method according to claim 6, wherein the object is transferred to a jig of a machine tool at the install place.

12. The method according to claim 6, wherein the plurality of fingers of the first robot hand are driven by one or more servomotors.

13. The method according to claim 12, wherein the one or more servomotors for driving the fingers of the first robot hand are controlled by a controller of the first robot.

* * * * *

UNITED STATES PATENT AND TRADEMARK OFFICE
CERTIFICATE OF CORRECTION

PATENT NO. : 7,244,093 B2  Page 1 of 1
APPLICATION NO. : 10/627722
DATED : July 17, 2007
INVENTOR(S) : Atsushi Watanabe et al.

It is certified that error appears in the above-identified patent and that said Letters Patent is hereby corrected as shown below:

Sheet 4 of 4 (FIG. 4), Block S3, Line 1, change "HODLING" to --HOLDING--.

Column 2, Line 56, after "machine" change ":" to --;--.

Column 3, Line 11, change "fist-first" to --first--.

Column 3, Line 15, after "supplied" delete "workpiece" and insert --workpiece, or a three-dimensional sensor for detecting the position/orientation of the supplied workpiece--.

Column 5, Line 44, change "1" to --41--.

Signed and Sealed this

Tenth Day of June, 2008

JON W. DUDAS
*Director of the United States Patent and Trademark Office*